(12) United States Patent
Godin et al.

(10) Patent No.: US 9,277,529 B2
(45) Date of Patent: Mar. 1, 2016

(54) RADIO ACCESS NETWORK DEFINED PAGING AREA

(71) Applicant: Alcatel-Lucent, Paris (FR)

(72) Inventors: Phillipe Godin, Viroflay (FR);
Jean-Michel P. Pugeat, Paris (FR);
Omar Salvador, Wheaton, IL (US)

(73) Assignee: Alcatel Lucent, Boulogne-Billancourt (FR)

( * ) Notice: Subject to any disclaimer, the term of this patent is extended or adjusted under 35 U.S.C. 154(b) by 160 days.

(21) Appl. No.: 13/858,356

(22) Filed: Apr. 8, 2013

(65) Prior Publication Data
US 2014/0302880 A1 Oct. 9, 2014

(51) Int. Cl.
*H04W 68/00* (2009.01)
*H04W 68/02* (2009.01)

(52) U.S. Cl.
CPC ..................... *H04W 68/02* (2013.01)

(58) Field of Classification Search
CPC .................................................. H04W 68/02
USPC .............................. 455/458, 436, 456.1, 457; 370/331–338, 252, 259, 328
See application file for complete search history.

(56) References Cited

U.S. PATENT DOCUMENTS 6,594,493 B1 * 7/2003 Davies et al. ................. 455/436
2011/0261715 A1 * 10/2011 Norefors et al. .............. 370/252

FOREIGN PATENT DOCUMENTS

| CN | 101998670 A | 3/2011 |
| EP | 2254378 A1 | 11/2010 |
| WO | WO-2014/021770 A2 | 2/2014 |

OTHER PUBLICATIONS

International Search Report (PCT/ISA/210) and Written Opinion of the International Searching Authority (PCT/ISA/237) for International Application No. PCT/US2014/033143 dated Nov. 6, 2014.

* cited by examiner

*Primary Examiner* — Babar Sarwar
(74) *Attorney, Agent, or Firm* — Harness, Dickey & Pierce, P.L.C.

(57) ABSTRACT

A method of facilitating paging in a wireless communications network includes generating, at a radio access network (RAN) element of the communications network, a select paging area for a UE which is improved or optimized by taking RAN and UE specific information into account, the select paging area including information indicating one or more cells from among cells of the communications network to which paging messages are to be sent when paging the UE; and sending the select paging area from the RAN element to a core network (CN) element of the communications network.

10 Claims, 3 Drawing Sheets

RADIO ACCESS NETWORK DEFINED PAGING AREA

BACKGROUND

1. Field

Example embodiments relate generally to facilitating paging in a wireless communications network.

2. Related Art

A wireless communications network, for example a long term evolution (LTE) network, may include several cells. Once a user equipment (UE) within the communications network goes idle, the network may not know which of the several cells the UE is located in. Accordingly, when a network needs to communicate with an idle UE, the network may send information intended for the UE to several different cells. This process is called paging. The paging process is generally triggered by the mobility management entity (MME).

SUMMARY

A method of facilitating paging in a wireless communications network in accordance with example embodiments includes generating, at a radio access network (RAN) element of the communications network, a select paging area for a UE, the select paging area including information indicating one or more cells from among cells of the communications network to which paging messages are to be sent when paging the UE; and sending the select paging area from the RAN element to a core network (CN) element of the communications network.

According to at least one example embodiment, the communications network follows the long term evolution (LTE) protocol.

According to at least one example embodiment, the RAN element is an evolved Node B (eNB) and the CN element is a mobility management entity (MME).

According to at least one example embodiment, the generating the select paging area for the UE includes determining, at the eNB, a last serving cell, the last serving cell being a last cell of the eNB the UE was attached before discontinuing its connection to the eNB; analyzing RAN information associated with at least one of the last serving cell and the UE; and choosing, from among the cells of the wireless communications network, the one or more cells indicated by the select paging area, based on the analysis.

According to at least one example embodiment, the sending the select paging area includes including the select paging area in a context release or context release response message; and sending the context release or context release response message from the eNB to the MME.

A method of handling paging in a wireless communications network in accordance with example embodiments includes receiving, at a core network (CN) element of the communications network, a select paging area for a UE, the select paging area including information indicating one or more cells from among cells of the communications network to which paging messages are to be sent when paging the UE, the select paging area being received at the CN element from a radio access network (RAN) element of the communications network; and paging the UE by sending paging messages from the CN element to the one or more cells indicated by the select paging area.

According to at least one example embodiment, the communications network follows the long term evolution (LTE) protocol.

According to at least one example embodiment, the RAN element is an evolved Node B (eNB) and the CN element is a mobility management entity (MME).

According to at least one example embodiment, the receiving the select paging area includes receiving the select paging area at the MME in a context release or context release response message sent from the eNB.

A radio access network (RAN) element in accordance with example embodiments may include a processor configured to control operations for facilitating paging in a wireless communications network, the operations including, generating, at the (RAN) element, a select paging area for a UE, the select paging area including information indicating one or more cells from among cells of the communications network to which paging messages are to be sent when paging the UE; sending the select paging area from the RAN element to a core network (CN) element of the communications network.

A radio access network (RAN) element in accordance with example embodiments may include a processor configured to handle operations for facilitating paging in a wireless communications network, the operations including, receiving, at the CN element of the communications network, a select paging area for a UE, the select paging area including information indicating one or more cells from among cells of the communications network to which paging messages are to be sent when paging the UE, the select paging area being received at the CN element from a radio access network (RAN) element of the communications network; and paging the UE by sending paging messages from the CN element to the one or more cells indicated by the select paging area.

BRIEF DESCRIPTION OF THE DRAWINGS

At least one example embodiment will become more fully understood from the detailed description provided below and the accompanying drawings, wherein like elements are represented by like reference numerals, which are given by way of illustration only and thus are not limiting of example embodiments and wherein.

DETAILED DESCRIPTION OF EXAMPLE EMBODIMENTS

Figure 1:
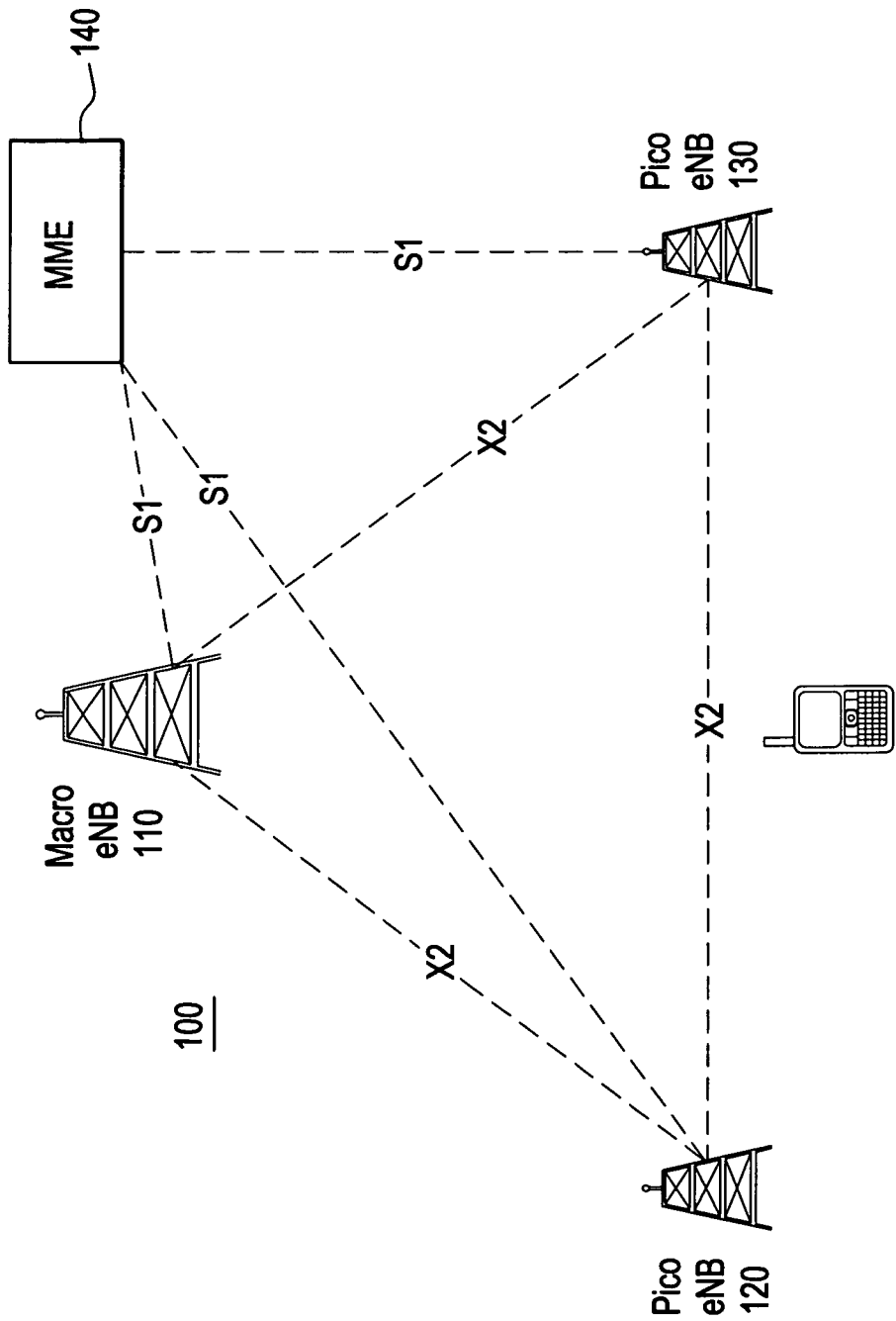
FIG. 1 is a diagram illustrating a portion of a wireless communications network.

Various example embodiments will now be described more fully with reference to the accompanying drawings in which some example embodiments are shown.

Detailed illustrative embodiments are disclosed herein. However, specific structural and functional details disclosed herein are merely representative for purposes of describing at least one example embodiment. Example embodiments may, however, be embodied in many alternate forms and should not be construed as limited to only the embodiments set forth herein.

Accordingly, while example embodiments are capable of various modifications and alternative forms, embodiments thereof are shown by way of example in the drawings and will herein be described in detail. It should be understood, however, that there is no intent to limit example embodiments to the particular forms disclosed, but on the contrary, example embodiments are to cover all modifications, equivalents, and alternatives falling within the scope of example embodiments. Like numbers refer to like elements throughout the description of the figures. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between", "adjacent" versus "directly adjacent", etc.).

The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

As used herein, the term user equipment (UE) may be considered synonymous to, and may hereafter be occasionally referred to, as a terminal, mobile, mobile unit, mobile station, mobile user, access terminal (AT), subscriber, user, remote station, access terminal, receiver, etc., and may describe a remote user of wireless resources in a wireless communication network. The term evolved Node B (eNB), may be considered synonymous to and/or referred to as a base station (BS), base transceiver station (BTS), NodeB, access point (AP), etc. and may describe equipment that provides the radio baseband functions for data and/or voice connectivity between a network and one or more users.

Exemplary embodiments are discussed herein as being implemented in a suitable computing environment. Although not required, exemplary embodiments will be described in the general context of computer-executable instructions, such as program modules or functional processes, being executed by one or more computer processors or CPUs. Generally, program modules or functional processes include routines, programs, objects, components, data structures, etc. that performs particular tasks or implement particular abstract data types.

The program modules and functional processes discussed herein may be implemented using existing hardware in existing communication networks. For example, program modules and functional processes discussed herein may be implemented using existing hardware at existing network elements or control nodes. Such existing hardware may include one or more digital signal processors (DSPs), application-specific-integrated-circuits (ASICs), field programmable gate arrays (FPGAs) computers or the like.

In the following description, illustrative embodiments will be described with reference to acts and symbolic representations of operations (e.g., in the form of flowcharts) that are performed by one or more processors, unless indicated otherwise. As such, it will be understood that such acts and operations, which are at times referred to as being computer-executed, include the manipulation by the processor of electrical signals representing data in a structured form. This manipulation transforms the data or maintains it at locations in the memory system of the computer, which reconfigures or otherwise alters the operation of the computer in a manner well understood by those skilled in the art.

Overview of Network Architecture

FIG. 1 illustrates a portion of a wireless communication network 100. The wireless communication network 100 may follow, for example the long term evolution (LTE) protocol. The wireless communication network 100 may include a macro eNB 110, a first pico eNB 120 a second pico eNB 130 a mobility management entity (MME) 140 and a UE 150. Though not pictured for simplicity, the wireless communications network 100 may include any number of additional eNBs, UEs and MMEs. Further, the wireless communications network 100 may include other elements of an LTE core network including, for example, a serving gateway (SGW), and a packet data network (PDN) gateway (PGW).

The macro eNB 110 provides wireless coverage for UEs within one or more cells associated with the eNB 110; first pico eNB 120 provides wireless coverage for UEs within one or more cells associated with the first pico eNB 120; and the second pico eNB 130 provides wireless coverage for UEs within one or more cells associated with the second pico eNB 130. Wireless communications network 100 represents an example of a heterogeneous network (HetNet). Accordingly, the cells of first and second pico eNBs 120 and 130 are underlaid with respect to one or more of the cells of macro eNB 110. Consequently, the cells of first and second pico eNBs 120 and 130 provide supplemental support to one or more of the cells of macro eNB 110. As is illustrated in FIG. 2, the macro eNB 110, the first pico eNB 120 and the second pico eNB 130 are capable of communicating with one another via X2 interfaces.

As is illustrated in FIG. 1, the MME 140 is connected to the macro eNB 110, the first pico eNB 120 and the second pico eNB 130 via respective S1 interfaces. In accordance with known methods, the MME 140 manages network operations for wireless communications network 100 including handling the establishment of connections between UEs and a core network of the wireless network 100 via eNBs, and the handling of tracking and paging for idle UEs, for example, idle UEs camping on one of the cells of the macro eNB 110, the first pico eNB 120 or the second pico eNB 130.

The UE 150 may be any wireless communications device including, for example, a mobile phone, smart phone, computer, or personal digital assistant (FDA).

Figure 2:
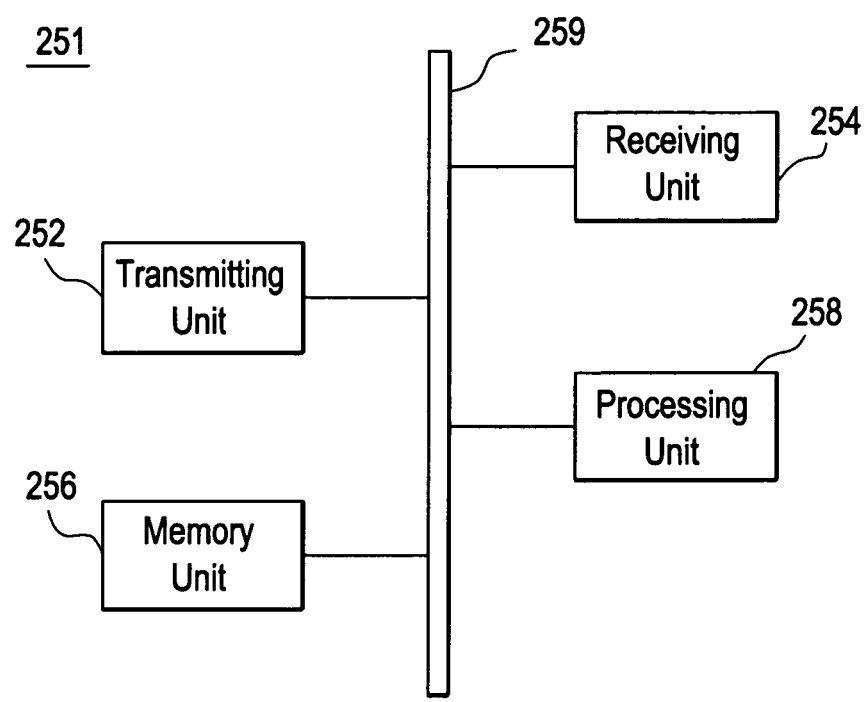
FIG. 2 is a diagram illustrating an example structure of a network element in accordance with at least some example embodiments.

FIG. 2 is a diagram illustrating a structure of a network element 251. The network element 251 may be any network element which determines a select paging area and/or initiates a paging operation based on a select paging area. For example, one or more of the macro eNB 110, the first pico eNB 120, the second pico eNB 130, and the MME 140 may incorporate or embody an element having the structure and operation of the network element 251.

Referring to FIG. 2, the network element 251 may include, for example, a data bus 259, a transmitting unit 252, a receiving unit 254, a memory unit 356, and a processing unit 358.

The transmitting unit 252, receiving unit 254, memory unit 256, and processing unit 258 may send data to and/or receive data from one another using the data bus 259. The transmitting unit 252 is a device that includes hardware and any necessary software for transmitting wired and/or wireless signals including, for example, data signals and control signals, via one or more wired and/or wireless connections to network elements in the wireless communications network 100.

The receiving unit 254 is a device that includes hardware and any necessary software for receiving wired and/or wireless signals including, for example, data signals and control signals, via one or more wired and/or wireless connections to network elements in the wireless communications network 100.

The memory unit 256 may be any device capable of storing data including magnetic storage, flash storage, etc.

The processing unit 258 may be any device capable of processing data including, for example, a microprocessor configured to carry out specific operations based on input data, or capable of executing instructions included in computer readable code.

For example, if the network element is embodied by an eNB, in accordance with methods which will be discussed in greater detail below with reference to FIG. 3, the processing unit 258 is capable of analyzing information available to the eNB to determine, for a given UE, a select paging area including specific cells and/or eNBs to which paging messages should be sent in the event that UE needs to be paged.

Example methods for operating the network element 251 will now be discussed in greater detail below with reference FIG. 3.

According to at least one example embodiment, each of the operations discussed herein as being performed by a RAN node or eNB may be performed by, for example, an element having the structure of the network element 251 as illustrated in FIG. 2. For example, the memory unit 256 may store executable instructions corresponding to each of the operations described below with reference to FIG. 3 as being performed by an eNB, as well as any data described with respect to FIG. 3 as being stored by an eNB. Further, the processor unit 258 may be configured to perform each of the operations described below with respect to FIG. 3 as being performed by an eNB, for example, based on executable instructions stored in the memory unit 256. Further, according to at least one example embodiment, data and/or control signals described as being transmitted or received by an eNB may be transmitted through the transmitting unit 252, or received through the receiving unit 254.

Further, according to at least one example embodiment, each of the operations described herein as being performed by a core network (CN) element or MME may be performed by, for example, an element having the structure of the network element 251 as illustrated in FIG. 2. For example, the memory unit 256 may store executable instructions corresponding to each of the operations described below with reference to FIG. 3 as being performed by an MME, as well as any data described with respect to FIG. 3 as being stored by an MME. Further, the processor unit 258 may be configured to perform each of the operations described below with respect to FIG. 3 as being performed by an MME, for example, based on executable instructions stored in the memory unit 256. Further, according to at least one example embodiment, data and/or control signals described as being transmitted or received by an MME may be transmitted through the transmitting unit 252, or received through the receiving unit 254.

In a scenario where the UE 150 is an idle UE camping on a cell of an eNB connected to the MME 140, the MME 140 is responsible for tracking the UE 150 and paging the UE 150 in the event the communications network 100 needs to communicate with the UE 150. In accordance with a first conventional paging method, the MME 140 will not know an exact cell the UE 150 is camping on, and thus, the MME 140 will not know an exact cell to which to send a paging message intended for the UE 150. Thus, in accordance with the first conventional method, in an attempt to ensure the paging message reaches the UE 150, the MME 140 can send the paging message to a paging area including each of the cells in one or more tracking areas (TAs). The MME 140 can determine which TAs to send the paging message to by checking a context of the UE stored at the MME in accordance with known methods. Because each tracking area may include, for example, 100 cells, the MME 140 may be required to send paging messages to a paging area including, for example, 400 cells. Further, the 400 cells may be associated with 100 or more different eNBs. Accordingly, the process of paging a single UE one time may include sending several hundred paging messages which need to be processed by 100 or more different eNBs. Further still, since an MME may be supporting any number of UEs, and several of the supported UEs may need to be paged one or more times over a given amount of time, the first conventional method represents a significant signaling burden on the MME, the associated eNBs and the wireless network in general with signaling overhead on the radio channels.

In accordance with a second conventional method, an MME may check context information stored at the MME to determine the last N serving eNBs of a UE being paged, where N is a natural number. The MME can then chose, as a first paging area, only cells of the last N serving eNBs. However, a single eNB may be associated with several cells (up to 256 cells). Accordingly, sending paging messages to the first paging area including every cell of the N last serving eNBs may still require a large number of paging messages to be sent. Further, it is possible that the UE has moved to a cell of an eNB which is close to the N last serving eNBs but, nonetheless, not one of the N last serving eNBs. If this happens, the UE being paged may not be located in the first paging area, and thus, the MME may need to execute an additional paging operation using a second paging area defined, for example, in the manner discussed above with respect to the first conventional paging method. Consequently, the second paging area may include, for example, 400 or more cells.

Accordingly, it would be beneficial to define a first paging area in a manner that maintains a high probability of successfully capturing the UE in the first paging area while also limiting the signaling burden associated with the first paging area by including a relatively small number of cells inside the first paging area, when compared, for example, to the hundreds of cells in one or more TAs.

A method for facilitating paging using radio access network (RAN) defined paging areas in accordance with at least some example embodiments will now be discussed in greater detail below.

Improved Paging Using RAN Defined Paging Areas

In general, an eNB in a wireless communications network knows a substantial amount of information about the specifics of the RAN portion of the communications network. This information known by the eNB includes RAN information which is both i) relevant to idle UEs being paged and, ii) conventionally not known by the MME. This RAN information includes, for example, the specific cell an idle UE was last attached to when the UE was active (i.e., not idle) if the eNB supports multiple cells; a type of cell the idle UE was last attached to when active, the radio neighbors of the eNB and/or the cell the idle UE was last attached to when active, and the camping and radio priorities of the UE when idle. With respect to cell types, the RAN information known by the eNB and not the MME can include whether a last cell of the idle UE was attached to when active was a macro cell or a pico cell in a HetNet, or a specific band of the last cell (and of the neighbor cells of that last cell) the UE was attached to while active in multi-band network capable of supporting different cells associated with different frequency bands.

The above-referenced RAN information would be useful for defining an improved or optimized paging area. However, paging areas are conventionally determined by the MME and, as is discussed above, the above-referenced RAN information is generally not known by the MME. Accordingly, the MME is not able to generate improved or optimized paging areas using the RAN information discussed above.

Thus, in order to address the problems discussed above, the method for facilitating paging using RAN defined paging areas in accordance with at least some example embodiments includes generating a select paging area for a UE at an eNB using RAN information known by the eNB, and providing the select paging area from the eNB to an MME for the MME to use when paging the UE. The select paging area includes a list of cells and/or eNBs which are chosen intelligently by a serving eNB using RAN information known by the serving eNB. By sending paging messages only to cells within the select paging area, the signaling burden experienced by the MME and eNBs participating in a paging operation may be reduced. Further, because the select paging area is determined intelligently based on RAN information, select paging area can maintain a high probability of allowing the successful paging of the UE. The method for facilitating paging using RAN defined paging areas will now be discussed in greater detail with referent to FIG. 3.

Figure 3:
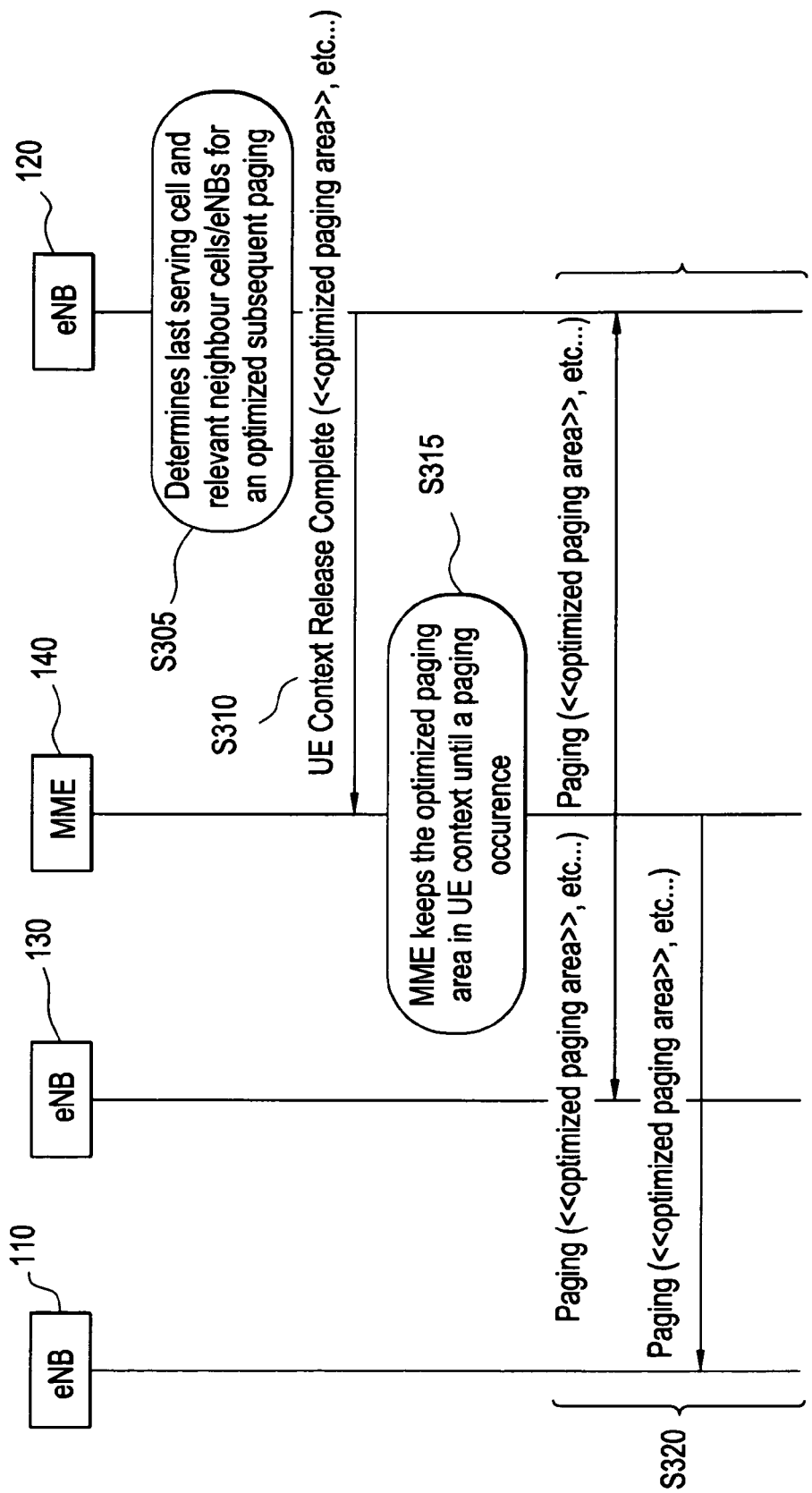
FIG. 3 is a communications flow diagram explaining a method of facilitating a paging operation in accordance with at least some example embodiment.

FIG. 3 is a communications flow diagram illustrating an example of the method of facilitating paging using RAN defined paging areas according to at least some example embodiments. FIG. 3 will now be explained with reference to wireless communications network 100 illustrated in FIG. 1 in a scenario where the UE 150 is initially attached to the first pico eNB 120, the UE 150 leaves the first pico eNB 120 and becomes idle, and the MME 140 attempts to page the UE 150.

Referring to FIG. 3, in step S310, the first pico eNB 120 determines a select paging area for the UE 150. The select paging area may be a list of cells to send paging message to when paging the UE 150. The select paging area is constructed with the purpose of providing desirable or optimal values for both the probability that the UE 150 is included in the paging area and the number of cells included in the paging area. Ideally, the probability of capturing the UE 150 in the select paging area is high, while a total number of cells in the select paging area, and thus signaling burden associated with sending paging messages to each of the cells, are low.

For example, when a decision is made by the first pico eNB 120 to move the UE 150 to idle state while serving the UE 150 from a cell of the first pico eNB 120, the first pico eNB determines a select paging area for the UE 150 based on RAN information available at the first pico eNB 120 including, for example: the specific cell, from among the one or more cells of the first pico eNB 120, which was the last serving cell of the UE 150, the last serving cell being the last cell of the pico eNB 120 the UE 150 was attached to while active; the fact that the type of the last serving cell of the UE 150 is a pico cell type; the identity of the macro cell the last serving cell is underlaid with respect to, given that the last serving cell is a pico cell; the radio neighbors of the last serving cell; the camping preferences and radio capabilities of the UE 150; and the frequency band of the last serving cell and of the radio neighbors of the last serving cell.

According to at least some example embodiments, eNBs within the wireless communications network 100 are capable of obtaining the above-referenced RAN information in accordance with known methods specified in the LTE standards.

For example, an eNB in wireless communications network 100 regularly keeps track of information regarding its own cells. Accordingly, for a given UE, an eNB will know the cell identity of the last serving cell and the cell type (i.e., macro/pico, frequency band, etc.) of the last serving cell, and the macro cell each of its cells are underlaid with respect to. For example, with respect to the first pico eNB 120, for each cell of the first pico eNB 120, the first pico eNB 120 knows the identity of the macro cell the cell of the first pico eNB 120 is underlaid with respect to.

Further, in accordance with known methods, an eNB in wireless communications network 100 will receive measurement reports for UEs connected to the eNB. The measurement reports will include information regarding other cells detected by the UEs which can be used to determine neighbor cells. Consequently, for a given cell of the first pico eNB 120, the first pico eNB 120 can determine the other cells detected by UEs attached to the given cell to be radio neighbors of the given cell. For example, UEs attached to a first cell of the first pico eNB 120 may send measurement reports to the first pico eNB 120 including measurements of signals received from one or more cells of the second pico eNB 130. Thus, the first pico eNB 120 may classify the one or more cells of the second pico eNB 130 included in the measurement reports of the UEs attached to the first cell as radio neighbors of the first cell.

Further, in accordance with known methods, UEs connected to the first pico eNB 120 notify the first pico eNB 120 of their radio capabilities and camping preferences. The radio capabilities may include, for example, which radio frequency bands the UE is capable of using for communications, and the camping preferences may include, for example, which frequency band the UE prefers to camp on when the UE is in an idle state and has a choice of radio frequency bands to camp on. The last serving eNB may also influence the camping preferences.

For example, in a HetNet, like wireless communications network 100, when an UE is last connected to a small cell eNB before moving to idle state, some research has shown that the probability of success of a subsequent paging operation that targets the UE and is limited to a paging area including the small cell and the macro cell the small cell is underlaid with respect to, is very high (e.g. above 70%). Accordingly, in step S305, because the first pico eNB 120 knows the last serving cell of the UE 150 was a pico cell, and also knows the identity of the macro cell the last serving cell was underlaid with respect to, the first pico eNB 120 can include the last serving cell and the overlay macro cell in the list of cells included in the select paging area.

Further, because the first pico eNB 120 knows radio neighbors of the last serving cell of the UE 150, the first pico eNB 120 can also include the radio neighbors of the last serving cell of the UE 150 in the select paging area in order to further increase the chances of successfully capturing the first UE 150 in the select paging area without significantly increasing the number of cells included in the select paging area.

As another example, in a network including cells having different radio frequency bands with respect to one another, an idle UE which is in a position that allows the idle UE to choose between two or more cells to camp on will choose which cell to camp on based on the camping priorities of the UE. The camping priorities of the UE may be derived, for example, from the radio capabilities of the UE. Again, a RAN node, like an eNB, would typically be aware of such priorities (could even influence them) whereas an MME is conventionally not supposed to decode and interpret radio capabilities. Consequently, an eNB in wireless communications network 100 can use the camping preferences and radio capabilities of a UE in order to choose cells to add to, or remove from, the select paging area. For example, the first pico eNB 120 can use camping preferences and/or radio capabilities of the UE 150 to remove, from a list of cells to be included in the select paging area, cells having radio frequency bands which do not conform with one or both of the camping preferences of the UE 150 and the radio capabilities of the UE 150. Accordingly, the first pico eNB 120 can further reduce the number of cells included in the select paging area, thereby reducing the signaling burden associated with sending paging messages to cells in the select paging area, without significantly reducing the probability of capturing the UE 150 in the select paging area.

Accordingly, based on the RAN information known by the first pico eNB 120, in step S305 the first pico eNB 120 can make an intelligent decision about which cells to include in the select paging area for a given UE.

In the example illustrated in FIG. 3, the select paging area determined by the first pico eNB 120 instep S305 includes cells of the first pico eNB 120, cells of the second pico eNB 130, and cells of the macro eNB 110.

Returning to FIG. 3, once the first pico eNB 120 determines the select paging area based on the RAN information available to first pico eNB 120, in step S310, the first pico eNB 120 sends the select paging area to the MME 140. For example, the first eNB 120 may include the select paging area in the known UE Context Release Complete message which is sent to upon the completion of the detachment of a UE from an eNB (UE moved to idle state).

Next, in step S315, the MME 140 receives and stores the select paging area sent by the first pico eNB 120.

Next, in step S320 the MME 140 pages the UE 150 using the select paging area received and stored in step S315. For example, some time after the UE 150 leaves the first pico eNB 120 in step S305, the UE 150 may switch to an idle state, and the MME may receive a request to page the UE 150. The MME 140 then pages the UE 150 by sending paging messages to the cells included in select paging area received by the MME 140 in step S315. In the example illustrated in FIG. 3, the select paging area received by the MME 140 in step S315 includes cells of the first pico eNB 120, cells of the second pico eNB 130 and cells of the macro eNB 110. Accordingly, as is illustrated in FIG. 3, in step S320, as a first paging attempt, the MME 140 sends paging messages (including the select paging area) to the macro eNB 110, the first pico eNB 120 and the second pico eNB 130 and, in accordance with at least some example embodiments, the MME 140 may not send paging messages to any other cells or eNBs in the first paging attempt. Accordingly, the signaling burden associated with paging the cells included in the select paging area may be significantly reduced in comparison to paging one or more TAs. The macro eNB 110, the first pico eNB 120, and the second pico eNB 130 will use the select paging area included in the paging message to determine in which of their cells the radio paging message shall be sent. Alternatively, in order to keep the select paging area fully transparent to the MME, the MME 140 can send the paging message (including the select paging area) only to the last serving eNB of the UE being paged. Accordingly, the MME 140 could send the paging message including the select paging area to the eNB 120 only and the eNB 120, based on the included select paging area, can propagate the select paging area to other eNBs whose cells are included in the select paging area. For example, the first pico eNB 120 can send the paging message (or an equivalent message) including the select paging area to its neighbors eNB 110 and eNB 130 over the X2 interface so that the latter eNBs can also generate corresponding radio paging messages towards UEs based on the cells included in the select paging area.

If the first paging attempt is unsuccessful, as a second paging attempt, the MME 140 may send paging messages to the cells of one or more TAs in accordance with known methods. However, because the accuracy of the select paging area has been improved or optimized based on the use of the RAN information which is available to the first pico eNB 120 and generally not available to the MME 140, the probability that the second paging attempt will be needed may be reduced, particularly in comparison to a paging operation which uses a relatively small paging area created without the benefit of the RAN information.

FIG. 3 is explained with reference to an example where the first pico eNB 120 generates a select paging area based on RAN information and sends the select paging area to the MME 140. However, according to at least some example embodiments, any RAN element, including for example other eNBs in the wireless communications network 100, that has access the RAN information discussed above with reference to step S310 can generate the select paging area and send the select paging area to the MME 140 or another core network (CN) element, for example in the same manner discussed above with reference to FIG. 3 and the first pico eNB 120.

Further, though FIG. 3 is explained with reference to an example where the MME 140 receives a select paging area and executes a paging operation based on the received select paging area, according to at least some example embodiments, any core network (CN) element responsible for handling a paging operation can receive a select paging area generated and sent by a RAN element, and execute a paging operation based on the received select paging area, for example in the same manner discussed above with reference FIG. 3 and the MME 140.

Example embodiments being thus described, it will be obvious that embodiments may be varied in many ways. Such variations are not to be regarded as a departure from example embodiments, and all such modifications are intended to be included within the scope of example embodiments.

What is claimed:

1. A method of facilitating paging in a wireless communications network, the method comprising:
    generating, at a radio access network (RAN) element of the communications network, a select paging area for a UE, the select paging area including a list of one or more cells from among cells of the communications network to which paging messages are to be sent when paging the UE; and
    sending the select paging area from the RAN element to a core network (CN) element of the communications network,
    wherein,
       the communications network follows the long term evolution (LTE) protocol, and
       the RAN element is an evolved Node B (eNB) and the CN element is a mobility management entity (MME).

2. The method of claim 1, wherein the generating the select paging area for the UE comprises:
    determining, at the eNB, a last serving cell, the last serving cell being a last cell of the eNB the UE was attached before discontinuing its connection to the eNB;

analyzing RAN information associated with at least one of the last serving cell and the UE; and choosing, from among the cells of the wireless communications network, the one or more cells indicated by the select paging area, based on the analysis.

3. The method of claim, 1, wherein the sending the select paging area comprises:
including the select paging area in a context release or context release response message; and
sending the context release or context release response message from the eNB to the MME.

4. A method of handling paging in a wireless communications network, the method comprising:
receiving, at a core network (CN) element of the communications network, a select paging area for a UE, the select paging area including a list of one or more cells from among cells of the communications network to which paging messages are to be sent when paging the UE, the select paging area being received at the CN element from a radio access network (RAN) element of the communications network; and
paging the UE by sending paging messages from the CN element to the one or more cells indicated by the select paging area,
wherein,
the communications network follows the long term evolution (LTE) protocol, and
the RAN element is an evolved Node B (eNB) and the CN element is a mobility management entity (MME).

5. The method of claim 4, wherein the receiving the select paging area includes receiving the select paging area at the MME in a context release or context release response message sent from the eNB.

6. A radio access network (RAN) element comprising:
a processor configured to control operations for facilitating paging in a wireless communications network, the operations including,
generating, at the (RAN) element, a select paging area for a UE, the select paging area including a list of one or more cells from among cells of the communications network to which paging messages are to be sent when paging the UE; and
sending the select paging area from the RAN element to a core network (CN) element of the communications network,
wherein,
the communications network follows the long term evolution (LTE) protocol, and
the RAN element is an evolved Node B (eNB) and the CN element is a mobility management entity (MME).

7. The eNB of claim 6, wherein the processor is further configured such that the generating the select paging area for the UE comprises:
determining, at the eNB, a last serving cell, the last serving cell being a last cell of the eNB the UE was attached before discontinuing its connection to the eNB;
analyzing RAN information associated with at least one of the last serving cell and the UE; and
choosing, from among the cells of the wireless communications network, the one or more cells indicated by the select paging area, based on the analysis.

8. The eNB of claim 6, wherein the processor is further configured such that the sending the select paging area comprises:
including the select paging area in a context release or context release response message; and
sending the context release or context release response message from the eNB to the MME.

9. A core network (CN) element comprising:
a processor configured to handle operations for facilitating paging in a wireless communications network, the operations including,
receiving, at the CN element, a select paging area for a UE, the select paging area including a list of one or more cells from among cells of the communications network to which paging messages are to be sent when paging the UE, the select paging area being received at the CN element from a radio access network (RAN) element of the communications network; and
paging the UE by sending paging messages from the CN element to the one or more cells indicated by the select paging area,
wherein,
the communications network follows the long term evolution (LTE) protocol, and
the RAN element is an evolved Node B (eNB) and the CN element is a mobility management entity (MME).

10. The MME of claim 9, wherein the processor is configured such that the receiving the select paging area includes receiving the select paging area at the MME in a context release or context release response message sent from the eNB.

* * * * *